(12) United States Patent
Delano et al.

(10) Patent No.: US 10,503,220 B2
(45) Date of Patent: Dec. 10, 2019

(54) VISCOUS FLOW BLOWER FOR THERMAL MANAGEMENT OF AN ELECTRONIC DEVICE

(71) Applicant: Microsoft Technology Licensing, LLC, Redmond, WA (US)

(72) Inventors: Andrew Douglas Delano, Woodinville, WA (US); Eric Paul Witt, Redmond, WA (US); Karsten Aagaard, Monroe, WA (US); Jason Scott Watts, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 15/352,573

(22) Filed: Nov. 15, 2016

(65) Prior Publication Data

US 2017/0300094 A1    Oct. 19, 2017

Related U.S. Application Data

(60) Provisional application No. 62/322,401, filed on Apr. 14, 2016.

(51) Int. Cl.
*G06F 1/20* (2006.01)
*F04D 29/28* (2006.01)
(Continued)

(52) U.S. Cl.
CPC ............. *G06F 1/20* (2013.01); *F04D 17/161* (2013.01); *F04D 25/08* (2013.01); *F04D 29/281* (2013.01);
(Continued)

(58) Field of Classification Search
CPC .......... G01F 1/20; F04D 17/161; F04D 25/08; F04D 29/281; F04D 29/288; F04D 29/584; G06F 1/203
See application file for complete search history.

(56) References Cited

U.S. PATENT DOCUMENTS

| 1,061,206 A | 5/1913 | Tesla |
| 2,632,598 A * | 3/1953 | Wales, Jr. ............. F04D 17/161 |
| | | 188/264 R |

(Continued)

FOREIGN PATENT DOCUMENTS

| GB | 1461776 A * | 1/1977 | ........... F04D 17/161 |
| WO | 0140111 A1 | 6/2001 | |

OTHER PUBLICATIONS

"International Search Report and Written Opinion Issued in PCT Application No. PCT/US2017/026876", dated Oct. 26, 2017, 21 Pages.

(Continued)

*Primary Examiner* — Richard A Edgar
(74) *Attorney, Agent, or Firm* — Ray Quinney & Nebeker P.C.; Paul N. Taylor

(57) ABSTRACT

Fan assemblies included within a computing device are described herein. The computing device includes a housing, a heat generating component supported within the housing, and a fan assembly. The fan assembly is operable to move heat generated by the heat generating component out of the housing. The fan assembly is supported within the housing. The fan assembly includes a shaft and a plurality of discs positioned along and fixed to the shaft. The shaft and the plurality of discs are rotatable relative to the housing about an axis of rotation.

19 Claims, 9 Drawing Sheets

(51) Int. Cl.
   *F04D 29/58* (2006.01)
   *F04D 17/16* (2006.01)
   *F04D 25/08* (2006.01)
(52) U.S. Cl.
   CPC ......... *F04D 29/288* (2013.01); *F04D 29/584* (2013.01); *G06F 1/203* (2013.01)

(56) References Cited

U.S. PATENT DOCUMENTS

| | | | |
|---|---|---|---|
| 5,188,508 A | | 2/1993 | Scott et al. |
| 5,297,926 A | | 3/1994 | Negishi |
| 5,388,958 A | | 2/1995 | Dinh |
| 5,394,040 A | | 2/1995 | Khanh |
| 5,699,854 A | | 12/1997 | Hong |
| 6,109,890 A | | 8/2000 | Horng |
| 6,132,170 A | | 10/2000 | Horng |
| 6,135,708 A | * | 10/2000 | Conrad ............... F01D 1/36 415/182.1 |
| 6,227,795 B1 | | 5/2001 | Schmoll, III |
| 7,273,091 B2 | | 9/2007 | Bahl et al. |
| 8,023,265 B2 | * | 9/2011 | Yang ............... F04D 25/0613 165/104.21 |
| 8,308,445 B2 | | 11/2012 | Gammack et al. |
| 2002/0097928 A1 | | 7/2002 | Swinton et al. |
| 2002/0146318 A1 | | 10/2002 | Horng |
| 2005/0019183 A1 | * | 1/2005 | Williams ............... F01M 1/02 417/423.1 |
| 2005/0231916 A1 | | 10/2005 | Bahl et al. |
| 2008/0277094 A1 | | 11/2008 | Peng et al. |
| 2010/0111720 A1 | * | 5/2010 | Hiner ............... F04D 5/001 417/321 |
| 2012/0227940 A1 | | 9/2012 | Thomas |
| 2017/0051757 A1 | * | 2/2017 | Sarmiento ............... F04D 29/58 |

OTHER PUBLICATIONS

Singh, et al., "Thermal Potential of Flat Evaporator Miniature Loop Heat Pipes for Notebook Cooling", In Proceedings of IEEE Transactions on Components and Packaging Technologies, vol. 33, No. 1, Mar. 2010, pp. 32-45.

Rice, Warren., "An Analytical and Experimental Investigation of Multiple Disk Pumps and Compressors", In Journal of Engineering for Power, vol. 85, Issue 3, Jul. 1963, pp. 191-198.

* cited by examiner

VISCOUS FLOW BLOWER FOR THERMAL MANAGEMENT OF AN ELECTRONIC DEVICE

PRIORITY

This application claims the benefit of U.S. Provisional Patent Application Ser. No. 62/322,401, filed on Apr. 14, 2016, which is hereby incorporated by reference in its entirety.

BRIEF DESCRIPTION OF THE DRAWINGS

For a more complete understanding of the disclosure, reference is made to the following detailed description and accompanying drawing figures, in which like reference numerals may be used to identify like elements in the figures.

Figure 1:
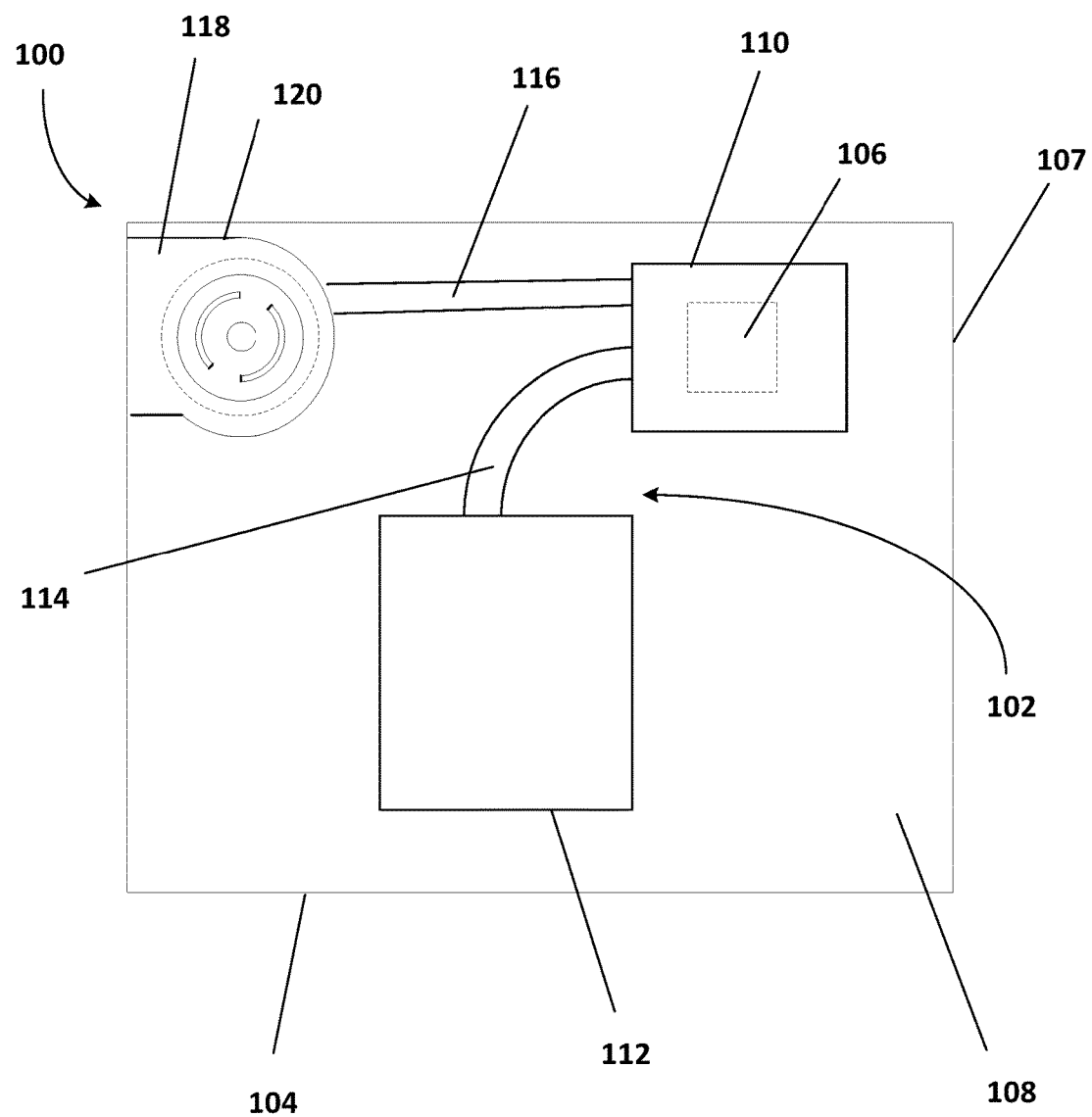
FIG. 1 depicts a top view of a computing device including an example of a thermal management system.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein

DETAILED DESCRIPTION

Current microprocessor design trends include designs having an increase in power, a decrease in size, and an increase in speed. This results in higher power in a smaller, faster microprocessor. Another trend is towards lightweight and compact electronic devices. As microprocessors become lighter, smaller, and more powerful, the microprocessors also generate more heat in a smaller space, making thermal management a greater concern than before.

The purpose of thermal management is to maintain the temperature of a device within a moderate range. During operation, electronic devices dissipate power as heat that is to be removed from the device. Otherwise, the electronic device will get hotter and hotter until the electronic device is unable to perform effectively. When overheating, electronic devices run slowly. This can lead to eventual device failure and reduced service life.

As computing devices get smaller (e.g., thinner), thermal management becomes more of an issue. Heat may be dissipated from a computing device using forced and natural convection, conduction, and radiation as a way of cooling the computing device as a whole and a processor operating within the computing device.

For forced convection, a thin computing device (e.g., less than 10.0 mm thickness) may include one or more very thin centrifugal blowers (less than 4.0 mm thickness). State of the art centrifugal blowers are less than 4.0 mm thick and have impellers on the order of 40 mm in diameter. The centrifugal blowers of the prior art operate in the range of 3,000 to 8,000 revolutions per minute (RPMs) and produce air speeds on the order of 25 to 30 miles per hour (MPH). At these scales, boundary layers created between impeller blades of the centrifugal blower grow on the order of, for example, 0.5 mm thickness per 7.0 mm of distance in a direction of flow. The centrifugal blowers are thus operating in a regime where viscous forces are equal to or greater than a desired inertial force created by the impeller blades. The viscous forces create disorganization in the flow field that causes reduction in efficiency and increase in acoustic noise.

Overall efficiency of these centrifugal blowers is less than three percent. In other words, if the centrifugal blower demands 0.5 Amps at 5.0 Volts, only three percent of this power is converted into organized air movement. The remaining 97 percent is converted into heat and noise. Because of viscous limitations, this trend will continue as blower size is decreased to fit inside thinner and thinner computing devices. Computing devices relying on smaller and smaller prior art centrifugal blowers for thermal management will experience reduced performance, as the smaller centrifugal blowers will provide lower pressure differentials and flow rates and higher acoustic noise and power demand.

The centrifugal blowers of the prior art also have mechanical issues when used in a thin computing device. When a user applies a force to an outer surface of the computing device (e.g., a touch screen), an inner surface of the computing device may flex towards and physically contact rotating impeller blades of a centrifugal blower. This may bind the impeller blades, which may generate additional noise, reduce performance of the computing device, and potentially damage the impeller blades.

Disclosed herein are apparatuses, systems, and methods for providing improved heat dissipation with a fan assembly including a bladeless impeller. The bladeless impeller includes two or more flat discs with one or more openings towards centers of the flat discs. The flat discs may be, for example, foils made of Mylar. The flat discs are spaced closely together (e.g., 0.3 mm apart from each other) to form a narrow channel. The flat discs are fixed to a shaft, and when the flat discs rotate, air between the flat discs is entrained by viscous forces. The air begins to rotate in a same direction as the flat discs. Since the air is unconstrained in a radial direction, the air also begins to move in the radial direction due to the fictitious centrifugal force. From an inside radius of the flat discs to an outside radius of the flat discs, the air is accelerated both tangentially and radially, and the air exits with a velocity vector that has radial and tangential components. The bladeless impeller may provide higher pressure differentials and flow rates and lower acoustic noise and power demand compared to similarly sized centrifugal blowers of the prior art. Flat discs that are, for example, foils may allow for impeller binding without producing additional noise and/or damaging the bladeless impeller.

As an example, the improved heat dissipation from a computing device including a housing and a heat generating component supported within the housing may be implemented by providing a fan assembly also supported within the housing. The fan assembly is operable to move heat generated by the heat generating component out of the housing. The fan assembly includes a shaft and a plurality of discs positioned along and fixed to the shaft. The shaft and the plurality of discs are rotatable relative to the housing about an axis of rotation.

Such heat dissipation apparatuses or systems have several potential end-uses or applications, including any electronic device having cooling components. For example, the heat dissipation apparatus may be incorporated into personal computers, server computers, tablet or other handheld computing devices, laptop or mobile computers, gaming devices, communications devices such as mobile phones, multiprocessor systems, microprocessor-based systems, set top boxes, programmable consumer electronics, network PCs, minicomputers, mainframe computers, or audio or video media players. In certain examples, the heat dissipation apparatus may be incorporated within a wearable electronic device, where the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

Using one or more of these features described in greater detail below, improved heat dissipation may be provided for the electronic device. With the improved heat dissipation feature, a more powerful microprocessor may be installed for the electronic device, a thinner electronic device may be designed, a higher processing speed may be provided, the electronic device may be operated at a higher power for a longer period of time, or any combination thereof may be provided when compared to similar electronic devices without one or more of the improved heat dissipation features. In other words, the heat dissipation features described herein may provide improved thermal management for an electronic device such as a mobile phone, tablet computer, or laptop computer.

FIG. 1 shows a top view of a computing device 100 including an example of a thermal management system 102. The computing device 100 may be any number of computing devices including, for example, a personal computer, a server computer, a tablet or other handheld computing device, a laptop or mobile computer, a communications device such as a mobile phone, a multiprocessor system, a microprocessor-based system, a set top box, a programmable consumer electronic device, a network PC, a minicomputer, a mainframe computer, or an audio and/or video media player.

The computing device 100 includes a housing 104 that supports at least the thermal management system 102 and a heat generating component 106. The housing 104 includes a first side (e.g., a top; not shown), a second side (e.g., a bottom; not shown), and at least one third side 107 extending between the first side and the second side. The heat generating component 106 may be any number of electrically powered devices including, for example, a processor, memory, a power supply, a graphics card, a hard drive, or another electrically powered device. The heat generating component 106 (e.g., a processor) may be supported by the housing 104 via, for example, a printed circuit board (PCB) 108 attached to and/or supported by the housing 104. The processor 106 is in communication with other electrical devices or components of the computing device 100 via the PCB 108, for example. The computing device 100 may include a number of components not shown in FIG. 1 (e.g., a hard drive, a power supply, connectors).

The thermal management system 102 may include one or more passive thermal modules 112 (e.g., a heat spreader such as a vapor chamber) and at least one phase change device 114 (e.g., a heat pipe or a vapor chamber). For example, a heat spreader 112 may be disposed on the processor 106. In the example shown in FIG. 1, the thermal management system 102 includes a first phase change device 114a and a second phase change device 114b. First ends of the first phase change device 114a and the second phase change device 114b, respectively, are in physical contact with and/or are adjacent to the processor 106. In one example, the first ends of the first phase change device 114a and the second phase change device 114b are physically attached to a surface of the processor 106 and/or a passive thermal module 112 (e.g., a heat spreader) via a layer of thermal adhesive. The thermal management system 102 also includes a fan 118.

The computing device 100 and/or the thermal management system 102 may include more, fewer, and/or different components. In one example, the thermal management system 102 also includes one or more heat sinks. For example, the heat spreader 112, the first phase change device 114a, the second phase change device 114b, another device, or any combination thereof may include a plurality of fins extending away from the heat spreader 112, the first phase change device 114a, the second phase change device 114b, the other device, or the combination thereof. The plurality of fins may be made of any number of thermally conductive materials including, for example, copper, aluminum, or titanium. In another example, the thermal management system 102 does not include the heat spreader 112, the first phase change device 114a, the second phase change device 114b, or any combination thereof, and the computing device 100 relies on the fan 118 and any additional fans for the majority of heat removal from the computing device 100.

The first phase change device 114a extends away from the processor 106 to the heat spreader 112 at a second end of the first phase change device 114a. The first phase change device 114a moves heat away from the processor 106 and towards the heat spreader 112. The second phase change device 114b extends away from the processor 106 to the fan 118 (e.g., a fan assembly) at a second end of the second phase change device 114b. One or more components of the thermal management system 102 are attached to the housing 104 in any number of ways including, for example, using one or more connectors (e.g., screws, flanges, tabs).

In the example shown in FIG. 1, the second end of the second phase change device 114b is physically attached to a fan housing 120 of the fan assembly 118. The second end of the second phase change device 114b may be physically attached to the fan housing 120 in any number of ways including, for example, with an adhesive (e.g., a thermal adhesive), with solder, by a press fit (e.g., a friction fit between the second phase change device 114b and a recess in the fan housing 120), with one or more connectors (e.g., screws, nut/bolt combinations), or any combination thereof. In one example, the second phase change device 114b and the fan housing 120 are manufactured as a single component (e.g., 3D printed as a single component). The fan housing 120 may be made of any number of thermally conductive materials including, for example, copper, aluminum, or another thermally conductive material. In one example, the fan housing 120 is made of plastic.

The second phase change device 114b moves heat away from the processor 106 and towards the fan 118. The fan 118 actively cools the second phase change device 114b, moving heat out of the computing device 100 via vents in the housing 104 of the computing device 100. In the example shown in FIG. 1, the fan 118 is a bladeless impeller blower. In other examples, the computing device 100 includes additional fans. In one example, the thermal management system 102 does not include the second phase change device 114b, and the fan 118 and/or one or more additional fans are positioned adjacent to the processor 106.

Figure 2:
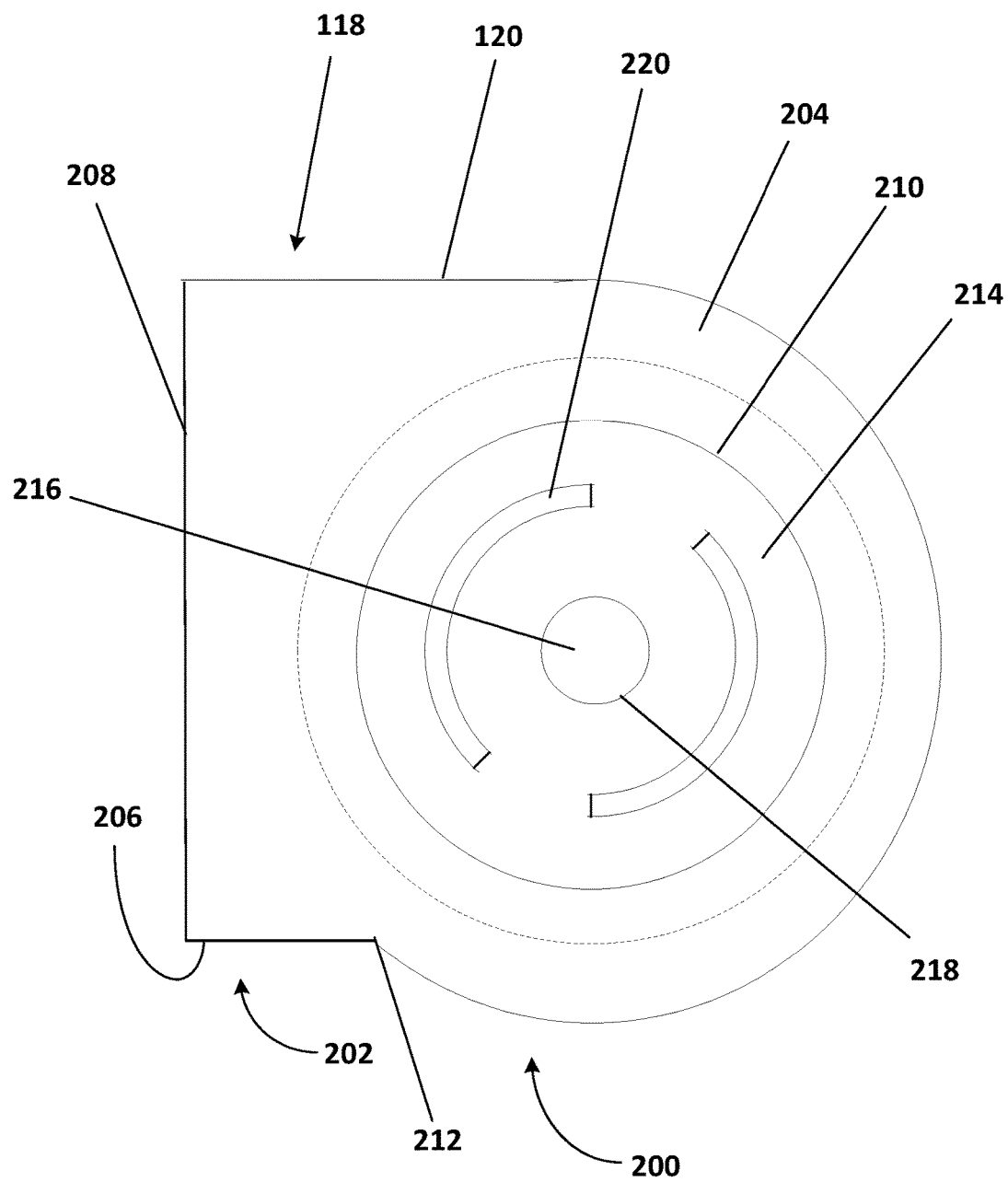
FIG. 2 depicts a top view of an example of a fan assembly including a bladeless impeller.

FIG. 2 shows a top view of one example of the fan 118 of FIG. 1. In the example shown in FIG. 2, the fan housing 120 is a scroll-shaped housing including a circular portion 200 (e.g., cylindrical portion) and a rectangular portion 202. The fan housing 120 includes a first side 204 (e.g., a top), a second side 206 (e.g., a bottom), and at least one third side 208 extending between the first side 204 and the second side 206. The first side 204 includes an opening 210 that acts as an inlet for air, for example, moving through the fan 118. The opening 210 may be any number of shapes including, for example, circular, and may be any number of sizes. The opening 210 may extend through the circular portion 200 or the circular portion 200 and the rectangular portion 202. A third side of the at least one third side 208 includes an opening (not shown) that acts as an outlet for the air moving through the fan 118. The opening through the third side 208 may be any number of shapes including, for example, rectangular, and may be any number of sizes. The opening through the third side 208 may extend through the rectangular portion 202, the circular portion 200, or a combination thereof. The inlet and the outlet through the fan housing 120 may be in different positions through the fan housing 120 than shown in FIG. 2.

A wedge 212 (e.g., a cutoff) is formed between the circular portion 200 and the rectangular portion 202 of the fan housing 120. The interaction of air flow produced by prior art centrifugal blowers having bladed impellers with a portion of a fan housing such as, for example, the wedge 212, may produce noise (e.g., blade-passing frequency tones) at unacceptable levels at higher operating rotational speeds. Smaller diameter impellers or lower operating speeds may be used to avoid this, thus decreasing performance of the thermal management system. Due to the configuration of the fan assembly 118, as further described with reference to FIG. 3 below, the bladeless impeller blower 118 does not generate the blade-passing frequency tones at the rotational speeds of the prior art or may not generate such tones at all. This allows the impeller of the present examples to have a larger diameter, to be positioned closer to the wedge 212, and to rotate at a higher rotational frequency compared to the prior art. For example, the impeller of the present examples may rotate at at least 10,000 RPMs. In another example, the impeller may rotate at at least 20,000 RPMs.

The fan assembly 118 includes a plurality of discs or plates 214. The plurality of discs 214, for example, are spaced along a shaft 216. In one example, the plurality of discs 214 are equally spaced along the shaft 216. In other examples, spacing between the plurality of discs 214 along the shaft 216 may vary. The spacing between the plurality of discs 214 forms channels, through which the air flows. When the plurality of discs 214 rotate, the air between the plurality of discs 214 is entrained by viscous forces and begins to rotate in a same direction as the plurality of discs 214 (e.g., counter-clockwise). Since the air is unconstrained in the radial direction, the air also begins to move in a radial direction due to the fictitious centrifugal force. From an inner radius of a disc of the plurality of discs 214 to an outer radius of the disc, the air is accelerated both tangentially and radially, and eventually, the air exits via the outlet of the fan housing 120 with a velocity vector that has radial and tangential components.

As shown in the example of FIG. 2, the shaft 216 may be a solid shaft, to which the plurality of discs 214 are fixed. For example, a solid shaft 216 may be used when the fan assembly 118 includes a brushed direct current (DC) motor. Each disc of the plurality of discs 214 includes an opening 218 through which the shaft 216 extends. The openings 218 through the plurality of discs 214 may be sized to match an outer diameter of the shaft 216. The plurality of discs 214 may be fixed to the shaft 216 with an adhesive, welding, a friction fit, other connectors, or any combination thereof.

Each disc of the plurality of discs 214 includes one or more additional openings 220 through which air enters the channels formed by the plurality of discs 214. The plurality of discs 214 in the example shown in FIG. 2 include two additional openings 220. Each disc of the plurality of discs 214 may include more or fewer additional openings 220. The additional openings 220 may be sized and shaped in any number of ways and may be positioned in any number of ways relative to the shaft 216. For example, the additional openings 220 may be shaped as arcs with an angular extent less than 180 degrees. In another example, the additional openings 220 may be shaped as sectors. The sizes of the additional openings 220 are different for the plurality of discs 214. For example, the sizes of the additional openings 220 vary along the shaft 214. The additional openings 220 may increase in size along the length of the shaft 214 in one direction or the other.

Figure 3:
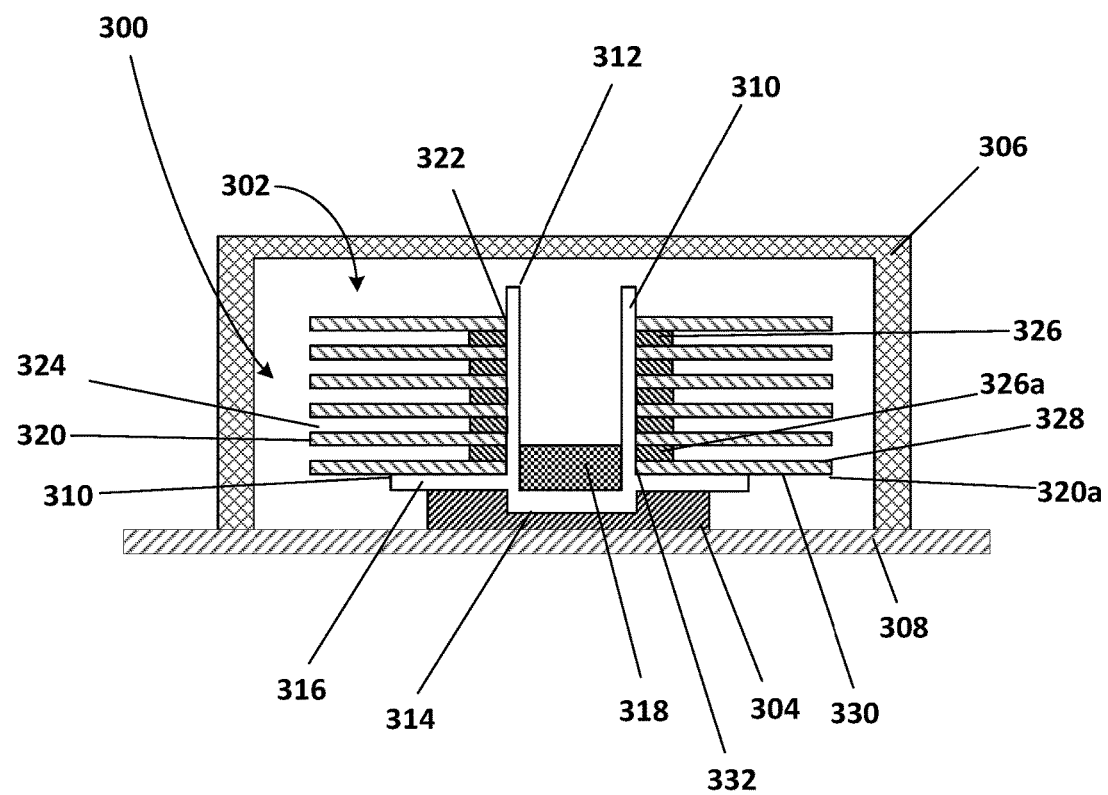
FIG. 3 depicts a cross section of another example of a fan assembly including a bladeless impeller.

FIG. 3 shows a cross section of another example of a fan assembly 300 including a bladeless impeller 302. The fan assembly 300 also includes a stator 304 and a housing 306. The stator 304 and the bladeless impeller 302 are supported by a printed circuit board (PCB) or a portion of the housing 306. In the example shown in FIG. 3, the stator 304 and the bladeless impeller 302 are supported by a PCB 308. Power is supplied to the stator 304 via the PCB 308. In another example, the stator 304 is supplied power via one or more connectors and/or cables.

The stator 304 includes windings, through which current flows, generating a magnetic field that rotates the bladeless impeller 302. The stator 304 also includes a bearing, in or on which the bladeless impeller 302 is positioned. At least a portion of the bearing of the stator 304 rotates relative to the housing 306 and/or the PCB 308. The fan assembly 300 includes a brushless motor operable to rotate the bladeless impeller 302.

In one example, magnets are disposed adjacent to the top and the bottom, respectively, of the housing 104 of the computing device 100 and/or adjacent to a top and a bottom, respectively, of the housing 306 of the fan assembly 300. The bladeless impeller 302 magnetically levitates and rotates without any contact or with minimal contact with the housing 104 of the computing device 100 and/or the housing 306 of the fan assembly 300.

The housing 306 or a portion of the housing 306 of the fan assembly 300 may be filled with a liquid, a gas (e.g., air), or a vapor. The housing 306 or the portion of the housing 306 of the fan assembly 300 may be fully or partially filled with the liquid, the gas, or the vapor. The bladeless impeller 302 rotates within the liquid, the gas, or the vapor included within the housing 306 or the portion of the housing 306. The liquid may be any number of liquids including, for example, water or a refrigerant. The gas may be, for example, air. The vapor may be, for example, water vapor.

In one example the housing 306 or the portion of the housing 306 is filled with a liquid including suspended particles. The housing 306 or the portion of the housing 306 may be filled with other liquid, gas, and/or vapor.

The bladeless impeller 302 includes a shaft 310 (e.g., a hub). The hub 310 is hollow, open on a first end 312, and may be, for example, cylindrical in shape. At or adjacent a second end 314, the hub 310 includes a flange 316 (e.g., a lip). The flange 316 may also be cylindrical in shape. Other shapes may be provided for the hub 310 and the flange 316. The hub 310 may be made of any number of materials including, for example, metal or plastic.

A magnet 318 (e.g., a permanent magnet) is disposed inside the hub 310. The permanent magnet 318 may be sized and shaped to fit inside the hub 310. For example, the permanent magnet 318 may be cylindrical in shape and may have a diameter that matches an inner diameter of the hub 310. The permanent magnet 318 may be fixed to one or more surfaces inside the hub 310. The permanent magnet 318 may be fixed to the hub 310 in any number of ways including, for example, with an adhesive. The permanent magnet 318 may be fixed to the hub 310 in other positions (e.g., underneath the hub 310).

The bladeless impeller 302 includes a plurality of discs or plates 320 (e.g., flat discs). In the example shown in FIG. 3, the plurality of discs 320 include six discs. More or fewer discs may be provided. The number of discs 320 may be a maximum number of discs 320 that will fit within a dimension (e.g., a length, a width, and/or a thickness) of a housing of a computing device (e.g., less than 5.0 mm). In the example shown in FIG. 3, the plurality of discs 320 are cylindrical in shape. In other examples, the plurality of discs or plates 320 are other shapes (e.g., having an oval cross-section). The plurality of discs 320 may all be the same size and/or shape, or different subsets of discs 320 may have different sizes and/or shapes. The diameters of the discs 320 may be determined by the size and the shape of the computing device in which the fan assembly 300 is installed. For example, the diameters of the discs 320 may be 50 mm or less based on space available for a thermal management system within the computing device.

In one example, one or more coils may be positioned adjacent to the perimeters of the plurality of discs 320, respectively. Current flows through the one or more coils, generating a magnetic field. Each disc of the plurality of discs 320 may include magnetic material at the perimeter of the disc, and/or poles may be coded to the plurality of discs 320. The generated magnetic field, interacting with the magnetic material and/or the coded poles of the plurality of discs 320, rotates the plurality of discs 320. In one example, the bladeless impeller 302 does not include the hub 310, and the bladeless impeller 302 rotates around a component to be cooled within, for example, a computing device.

In one example, the fan assembly 300 includes an impeller that is a hybrid of the impeller of the prior art and the bladeless impeller 302 described above and below. The impeller includes flat discs that are positioned along an axle (e.g., a shaft such as the hub 310). Struts support the discs from the axle. Each of the struts has a blade shape, and a flat part of the strut is perpendicular to a circular surface of the disk. As the struts and the disc spin, the struts throw air outward centrifugally. The air travels outward until reaching an inner radius of the disc. At this time, the air enters a channel (e.g., formed between adjacent discs), and viscous flow takes over.

The plurality of discs 320 may be made of any number of materials including, for example, metal or plastic. Each disc of the plurality of discs 320 may be made of a same material, or different discs of the plurality of discs 320 may be made of different materials. In one example, the plurality of discs 320 are foils made of, for example, Mylar. In other examples, the plurality of discs 320 are a mesh material and/or are made of a fabric. If the plurality of discs 320 are foils, for example, impeller binding may not be as much of an issue as with centrifugal blowers of the prior art. If a force applied to an outer surface of an electronic device causes a surface of the electronic device to flex towards the fan assembly 300 and the surface of the electronic device contacts one or more foils of the plurality of foils 320, the flexible foils 320 move with the flexed surface and are not damaged.

Each disc of the plurality of discs 320 includes an opening 322. The opening 322 may be concentric with an outer perimeter of the disc 320. The diameter of the opening 322 of each disc 320 may be sized to match an outer diameter of the hub 310. The hub 310 extends through each of the openings 322.

The plurality of discs 320 are spaced along the hub 310. For example, the plurality of discs 320 are uniformly spaced along the hub 310. In another example, the spacing of the plurality of discs 320 is varied along the hub 310. The spacing between the plurality of discs 320 forms channels 324 through which air flows. The spacing between the plurality of discs 320 may be provided by spacers 326. The spacers 326 may be shaped like discs 320, but with a smaller outer diameter and/or a different thickness. Thicknesses of the spacers 326 may be set based on desired channel thicknesses to be provided. For example, the thickness of each of the channels 324 formed between the plurality of discs 320 may be at least 0.25 mm, 0.30 mm, or 0.35 mm. In one example, the fan assembly 300 does not include any spacers 326, and at least some of the discs 320 include extensions extending away from inner diameters of the discs 320, respectively. The extensions may be bent at an angle (e.g., 90 degrees) relative to one or more surfaces (e.g., the top and/or the bottom) of the discs 320.

Each disc of the plurality of discs 320 may be physically attached to one or more spacers 326, the hub 310, or a combination thereof in any number of ways including, for example, with an adhesive or welding. As an example, a first disc 320a of the plurality of discs 320 includes a first side 328 (e.g., a first circular side; a top), a second side 330 (e.g., a second circular side; a bottom), and at least one third side 332 extending from the first side 328 to the second side 330. The second side 330 of the first disc 320a is physically attached to the flange 316, the first side 328 of the first disc 320a is physically attached to a first spacer 326a, the third side 332 of the first disc 320 is physically attached to the hub 310, or any combination thereof with, for example, an adhesive. This configuration may be the same for all other discs of the plurality of discs 320 along the length of the hub 310, with the second side 330 of another disc 320 being attached to a spacer 326 instead of the flange 316. In one example, the bladeless impeller 302 does not include any spacers, and the hub 310 and the plurality of discs 320 are formed as a single contiguous part. For example, the hub 310 and the plurality of discs 320 may be 3D printed as a single contiguous piece of plastic.

In one example, the plurality of discs 320 include, at outer perimeters of the discs, different surface roughness, different shapes, and/or other configurations. For example, at a side extending between the first side 328 and the second side 330 (e.g., a fourth side) at the perimeter of the disc 320, the disc 320 may include different surface roughness patterns, openings of different shapes (e.g., hexagons) extending from the fourth side through to the third side 332 of the disc 320, and/or other configurations. In one example, at or adjacent to the perimeter of the disc 320, the disc 320 may be curved such that the first side 328 and the second side 330 of the disc 320 intersect at a point.

The first sides 328 and/or the second sides 330 of the plurality of discs 320 may include etched paths. The etched paths may follow expected air paths for an expected rotational speed of the fan assembly 300 during operation. The etched paths may guide the air flowing through the fan assembly 300 during operation (e.g., rotation) of the fan assembly 300. The expected air paths may be predetermined based on simulations of air flow through a modeled fan assembly, based on experimental results from injecting a sand blast into the fan assembly 300, or based on a combination thereof.

In one example, the fan assembly 300 may include a single cylindrical part (e.g., a cylinder) instead of the plurality of discs 320. The shaft may extend through a center of the cylinder, and the cylinder may rotate about an axis of rotation. The cylinder may include paths matching the predetermined expected air paths. For example, the paths may extend through the cylinder, along the length of the cylinder (e.g., in a direction parallel to the axis of rotation). In one example, the paths are chemically etched through the cylinder.

Like the plurality of discs 214 of FIG. 2, each disc of the plurality of discs 320 includes one or more openings that extend from the first circular side 328 to the second circular side 330, through the disc 320. The one or more openings in each of the discs 320 acts as an inlet to a corresponding channel 324.

The fan assembly 300 may be oriented within a computing device in any number of ways. For example, the fan assembly 300 may be oriented within the computing device such that an axis of rotation of the bladeless impeller 302 is perpendicular to a top (e.g., a touchscreen display of a tablet computer) and/or a bottom of the computing device. As another example, the fan assembly 300 may be oriented within the computing device such that the axis of rotation of the bladeless impeller 302 is parallel to the top and/or the bottom of the computing device. In such a configuration, the hub 310 may be longer, and more discs 320 may be disposed on the hub 310, as the length and the width of the computing device are greater than the thickness of the computing device.

Figure 4:
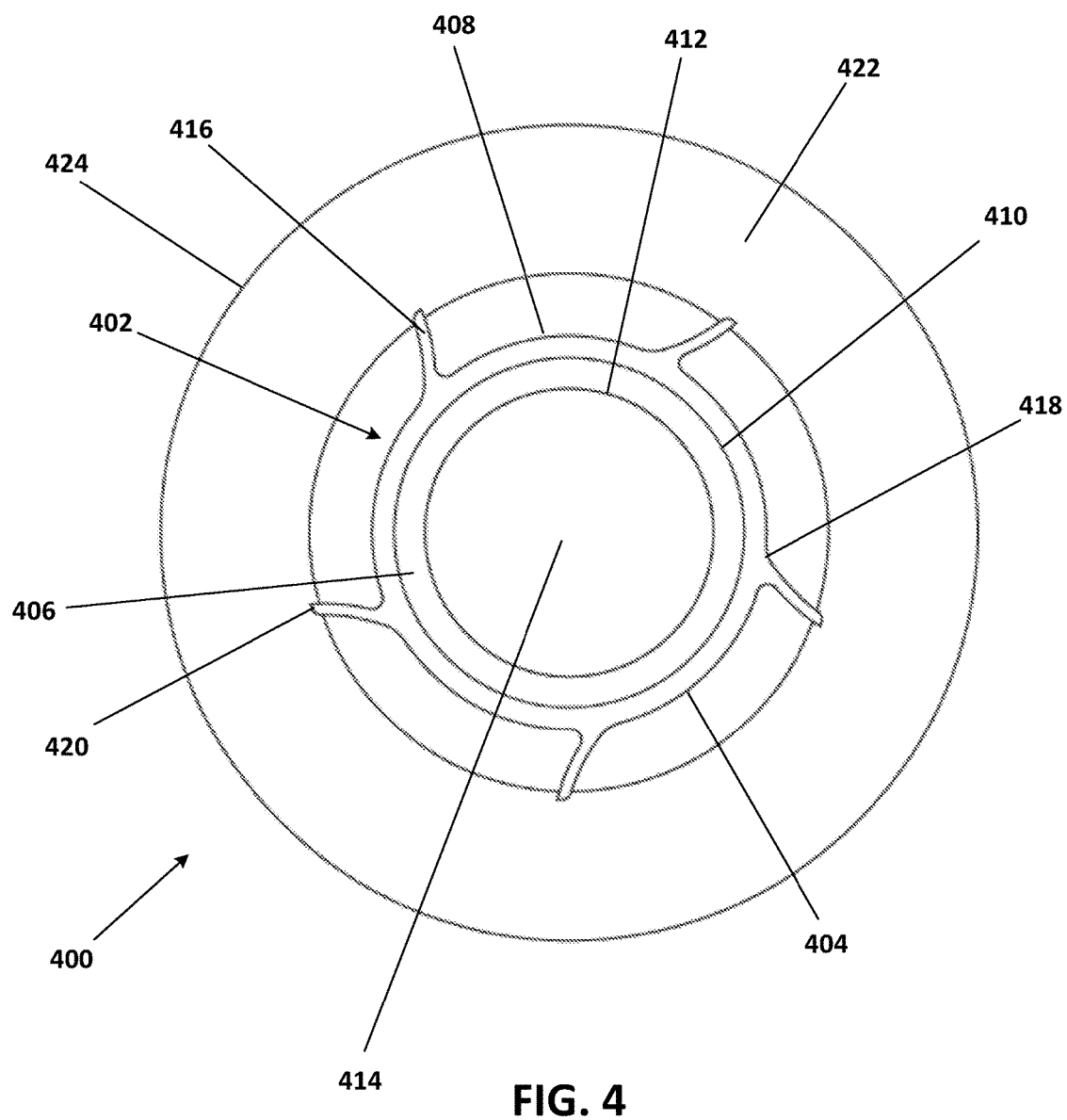
FIG. 4 depicts a top view of an example of a bladeless impeller.

FIG. 4 depicts a top view of another example of a bladeless impeller 400. The bladeless impeller 400 includes a hub 402. The hub 402 is hollow, open on at least a first end 404 (e.g., the first end 404 and a second end 406), and may be, for example, cylindrical in shape. The hub 402 includes an outer annular surface 408 and an inner annular surface 410. An opening 412 at the second end 406 may be smaller than an opening 414 at the first end 404, such that a magnet (e.g., a permanent magnet) may be positioned and/or fixed within the hub 402. The hub 402 may be made of any number of materials including, for example, metal or plastic.

The bladeless impeller 400 includes a plurality of extensions 416 (e.g., spokes) that extend from the outer annular surface 408 of the hub 402. The example shown in FIG. 4 shows five extensions 416, but more or fewer extensions may be provided. The plurality of extensions 416 may be integral with the hub 402 as a single part, or the plurality of extensions 416 may be physically attached to the hub 402 in any number of ways including, for example, with fasteners.

The plurality of extensions 416 may extend away from the outer annular surface 408 of the hub 402 at any number of positions along the hub 402. In one example, the plurality of extensions 416 are offset relative to the hub 402. In other words, the plurality of extensions 416 extend away from the first end 404 of the hub, in a first direction perpendicular to the first end 404, and then extend in a second direction, at an angle relative to the first direction.

Each extension of the plurality of extensions 416 has a first end 418 and a second end 420 and extends from the outer annular surface 408 of the hub 402 at the first end 418, away from the outer annular surface 408 of the hub 402, to the second end 420. The plurality of extensions 416 may extend away from the outer annular surface 408 of the hub 402 at any number of angles relative to the outer annular surface 408, such as, for example, 60 degrees.

The plurality of extensions 416 may be sized, shaped, and/or made of a material (e.g., an elastic material) such that the plurality of extensions 416 elastically flex from an initial, unloaded position, towards the outer annular surface 408 of the hub 402, and into a loaded position when an external force is applied. The plurality of extensions 416 return to the unloaded position when the external force is removed.

The bladeless impeller 400 includes a plurality of discs or plates 422 (e.g., flat discs). In the example shown in FIG. 4, the plurality of discs 422 include five discs. More or fewer discs may be provided. The number of discs 422 may be a maximum number of discs 422 that will fit within a dimension (e.g., a length, a width, and/or a thickness) of a housing of a computing device (e.g., less than 5.0 mm). In the example shown in FIG. 4, the plurality of discs 422 are cylindrical in shape. In other examples, the plurality of discs or plates 422 are other shapes (e.g., having an oval cross-section). The plurality of discs 422 may all be the same size and/or shape, or different subsets of discs 422 may have different sizes and/or shapes. The diameters of the discs 422 may be determined by the size and the shape of the computing device in which the bladeless impeller 400 is installed. For example, the diameters of the discs 422 may be 50 mm or less based on space available for a thermal management system within the computing device.

The plurality of extensions 416 may be angled relative to the outer annular surface 408 of the hub 402 such that the plurality of extensions 416 act as blades, guiding air into channels 424 formed between the plurality of discs 422. The plurality of discs 422 do not include openings corresponding to the openings 220 shown in FIG. 2. The spaces between the outer annular surface 408 of the hub 402, the plurality of extensions 416 and the plurality of discs 422, respectively, act as the openings 220 shown in FIG. 2, allowing air to enter the channels 424 formed between the plurality of discs 422, respectively.

Figure 5:
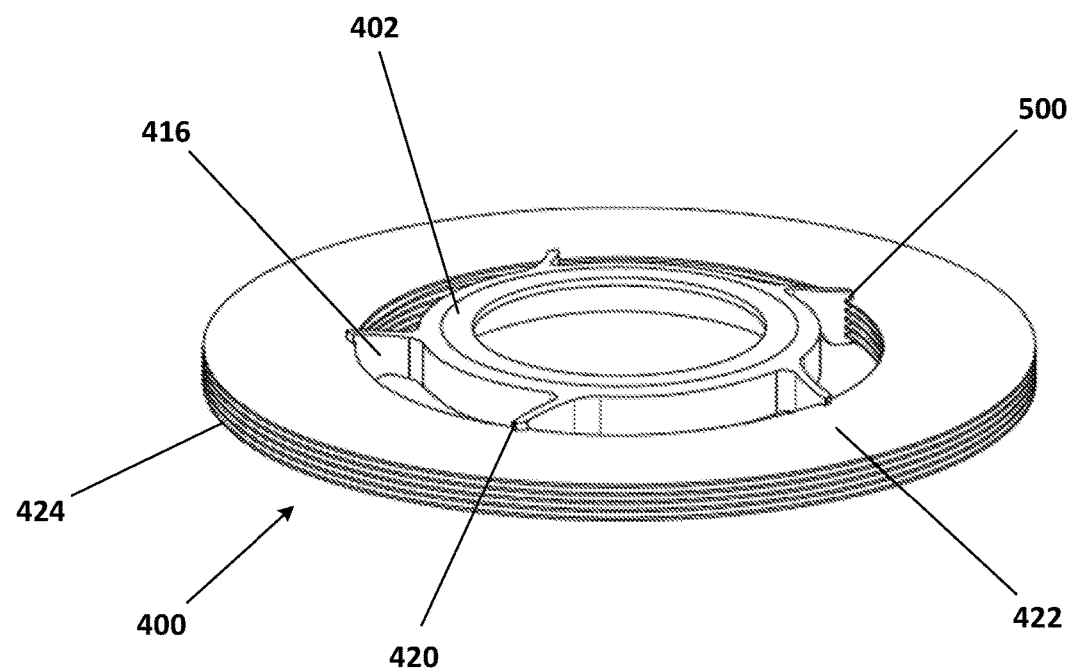
FIG. 5 depicts a front view of the bladeless impeller of FIG. 4.

FIG. 5 depicts an isometric projection view of the bladeless impeller 400 of FIG. 4. Each extension of the plurality of extensions 416 includes a plurality of slots 500 into which the plurality of discs 422 are respectively positioned. The number of slots of the plurality of slots 500 may match the number of discs of the plurality of discs 422. The plurality of slots 500 may be sized and shaped such that the plurality of discs 422 are secured to the hub 402 when the plurality of discs 422 are positioned within the plurality of slots 500. For example, the height of each slot of the plurality of slots 500 may match the thickness of a corresponding disc of the plurality of discs 422. In another example, the height of the slot 500 is less than the thickness of the corresponding disc 422 such that the corresponding disc 422 is fixed to the hub 402 via a friction fit with the respective extension 416.

The plurality of discs 422 may be physically attached to the hub 402 in any number of other ways. In one example, the plurality of extensions 416 do not include any slots, and the plurality of discs 422 are physically attached to the second ends 420 of the plurality of extensions 416, respectively.

Figure 6:
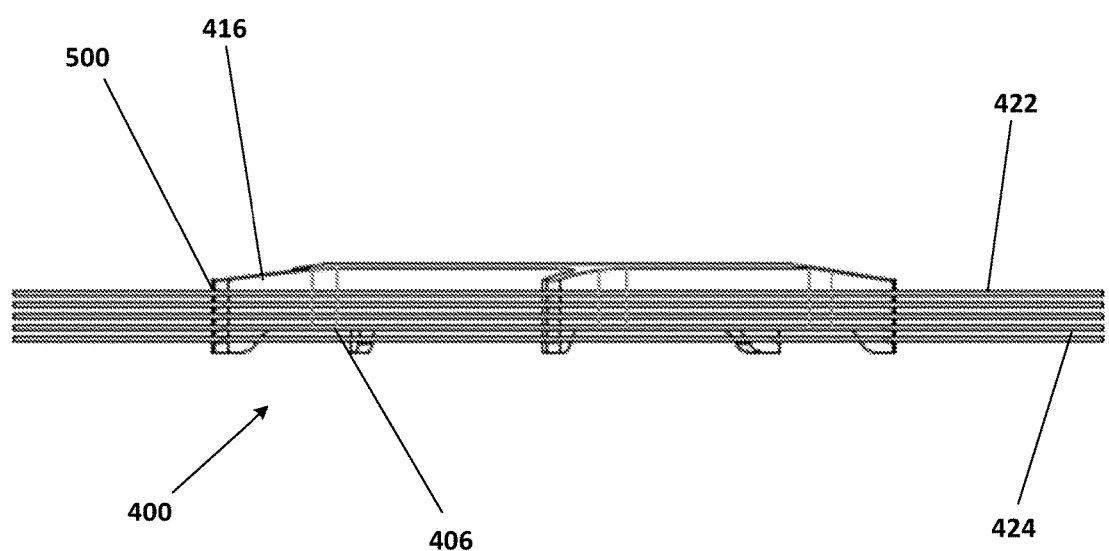
FIG. 6 depicts an isometric projection view of the bladeless impeller of FIG. 4.

FIG. 6 depicts a front view of the bladeless impeller 400 of FIG. 4. FIG. 6 shows the spacing of the plurality of slots 500 along respective extensions of the plurality of extensions 416. The positioning of the plurality of slots 500 along the respective extension 416 sets distances between the plurality of discs 422, respectively. In other words, the positioning of the plurality of slots 500 along the respective extension 416 sets heights of the channels 424, respectively. The heights of the channels 424 may be the same or may vary along the respective extension 416. The heights of the channels 424 may be any number of sizes depending on the cooling power to be provided by the bladeless impeller 400 and/or a size of the electronic device into which the bladeless impeller 400 is to be installed.

Figure 7:
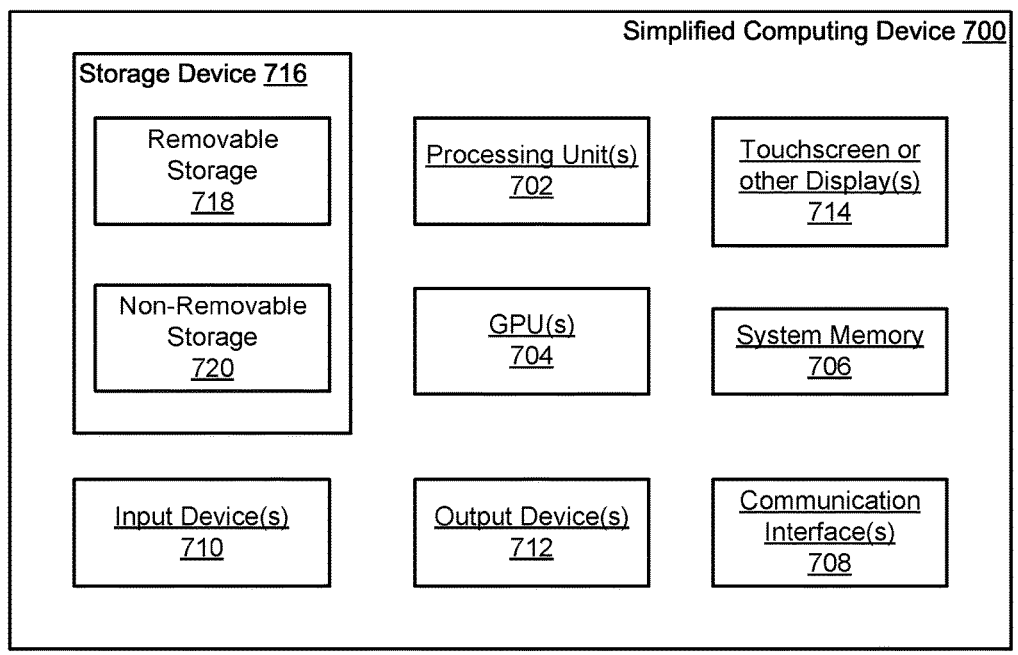
FIG. 7 is a block diagram of a computing environment in accordance with one example for implementation of the disclosed methods or one or more electronic devices.

With reference to FIG. 7, a thermal management system, as described above, may be incorporated within an exemplary computing environment 700. The computing environment 700 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. For example, the heat dissipating apparatus is incorporated within a computing environment having an active cooling source (e.g., fan).

The computing environment 700 has sufficient computational capability and system memory to enable basic computational operations. In this example, the computing environment 700 includes one or more processing units 702, which may be individually or collectively referred to herein as a processor. The computing environment 700 may also include one or more graphics processing units (GPUs) 704. The processor 702 and/or the GPU 704 may include integrated memory and/or be in communication with system memory 706. The processor 702 and/or the GPU 704 may be a specialized microprocessor, such as a digital signal processor (DSP), a very long instruction word (VLIW) processor, or other microcontroller, or may be a general purpose central processing unit (CPU) having one or more processing cores. The processor 702, the GPU 704, the system memory 706, and/or any other components of the computing environment 700 may be packaged or otherwise integrated as a system on a chip (SoC), application-specific integrated circuit (ASIC), or other integrated circuit or system.

The computing environment 700 may also include other components, such as, for example, a communications interface 708. One or more computer input devices 710 (e.g., pointing devices, keyboards, audio input devices, video input devices, haptic input devices, or devices for receiving wired or wireless data transmissions) may be provided. The input devices 710 may include one or more touch-sensitive surfaces, such as track pads. Various output devices 712, including touchscreen or touch-sensitive display(s) 714, may also be provided. The output devices 712 may include a variety of different audio output devices, video output devices, and/or devices for transmitting wired or wireless data transmissions.

The computing environment 700 may also include a variety of computer readable media for storage of information such as computer-readable or computer-executable instructions, data structures, program modules, or other data. Computer readable media may be any available media accessible via storage devices 716 and includes both volatile and nonvolatile media, whether in removable storage 718 and/or non-removable storage 720. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 700.

Figure 8:
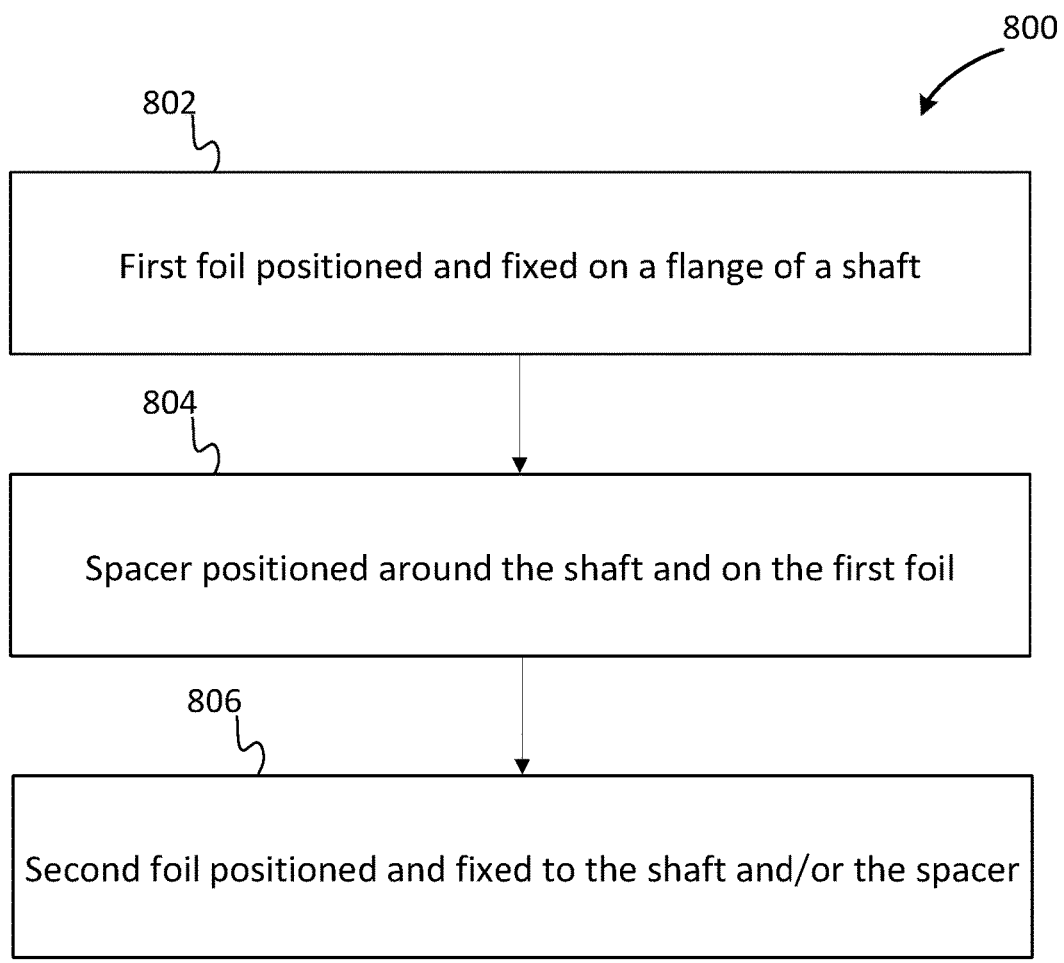
FIG. 8 is a flow diagram of a method for manufacturing a fan assembly in accordance with one example.

FIG. 8 shows a flow diagram of one example of a method 800 for manufacturing a fan assembly. The fan assembly may be a fan assembly shown in FIGS. 1-6 or may be another fan assembly. The method 800 is implemented in the order shown, but other orders may be used. Additional, different, or fewer acts may be provided. Similar methods may be used for manufacturing a fan assembly.

In the method 800, a plurality of foils (e.g., discs or plates) are fixed to a shaft, such that the plurality of foils are spaced apart from each other (e.g., uniformly) along the shaft. The plurality of foils spaced apart from each other form a plurality of channels.

In act 802, a first foil of a plurality of foils, which has a first side and a second side, is positioned and fixed on a flange extending from a first end of a shaft, such that the second side of the first foil abuts the flange. The first foil may be circular in shape (e.g., cylindrical) and may include an opening through which the shaft extends. Additionally or alternatively, the first foil is fixed to the shaft, and/or the shaft does not include the flange. The shaft may be a hollow hub or may be a solid piece of material. The first foil may be fixed on the flange in any number of ways including, for example, with an adhesive, welding, a friction fit, or another connector.

In act 804, a spacer is positioned around the shaft and on the first foil, such that the spacer abuts the first side of the first foil, and the spacer is fixed to the shaft and/or the first foil. The spacer may be circular in shape (e.g., cylindrical) and may include an opening through which the shaft extends. The spacer may have a smaller diameter and/or a different thickness than the plurality of foils. The spacer may be fixed to the shaft and/or the first foil in any number of ways including, for example, with an adhesive, welding, a friction fit, or another connector. In one example, the fan assembly does not include any spacers, and extensions extending from the inner diameter of each foil of the plurality of foils may be bent at an angle (e.g., 90 degrees) relative to the first side and/or the second side of the foil. The extensions may thus take the place of the spacers.

In act 806, a second foil of the plurality of foils, which has a first side and a second side, is positioned on the spacer, such that the second side of the second foil abuts the spacer, and the second foil is fixed to the shaft and/or the spacer. The second foil may be circular in shape (e.g., cylindrical) and may include an opening through which the shaft extends.

The second foil may be fixed to the shaft and/or the spacer in any number of ways including, for example, with an adhesive, welding, a friction fit, or another connector.

The plurality of foils may include more than two foils, and acts 804 and 806 may be repeated to build a larger stack. The plurality of discs (e.g., foils) may be made of any number of materials including, for example, metal, plastic, Mylar, or any combination thereof. The plurality of discs may be manufactured in any number of ways including, for example, stamping, etching, or another manufacturing method. In one example, a fan assembly is generated without using any spacers and/or the shaft does not include the flange. In other words, the discs or plates are fixed directly to the shaft.

As an optional act, surface features may be formed on a first circular side and/or a second circular side of at least one foil of the plurality of foils. The surface features may, for example, be etched on the first circular side and/or the second circular side of the at least one foil. The surface features may be etched based on a predetermined expected path. The predetermined air path may be determined by computer modeling the fan assembly and/or injecting a sand blast into the fan assembly.

Figure 9:
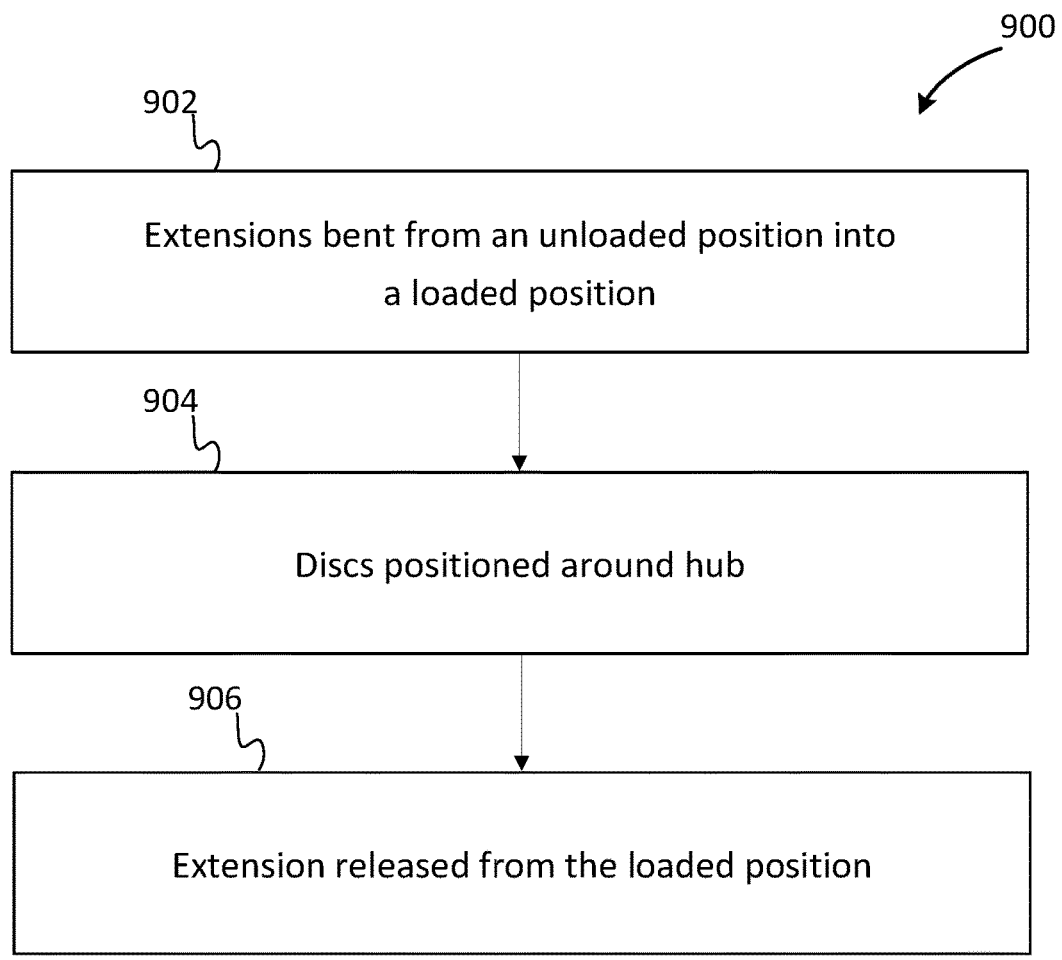
FIG. 9 shows a flow diagram of a method for manufacturing a fan assembly in accordance with another example.

FIG. 9 shows a flow diagram of another example of a method 900 for manufacturing a bladeless impeller of a fan assembly. The fan assembly may be a fan assembly shown in FIGS. 1-6 or may be another fan assembly. The method 900 is implemented in the order shown, but other orders may be used. Additional, different, or fewer acts may be provided. Similar methods may be used for manufacturing a bladeless impeller.

In the method 900, a plurality of foils, discs, or plates (e.g., discs) are fixed to a shaft or a hub (e.g., a hub), such that the plurality of discs are spaced apart from each other (e.g., uniformly) along the hub. The hub includes at least an outer annular surface (e.g., an outer annular surface and an inner annular surface). The plurality of discs spaced apart from each other form a plurality of channels.

The bladeless impeller also includes a plurality of extensions. Each extension of the plurality of extensions has a first end and a second end. The plurality of extensions are sized, shaped, and/or made of a material such that the plurality of extensions are elastic. The plurality of extensions are spaced (e.g., evenly) around the outer annular surface of the hub, and extend from the outer annular surface of the hub at the first ends, in a direction away from the outer annular surface of the hub, to the second ends, respectively.

Each extension of the plurality of extensions includes slots into which the plurality of discs are positionable, respectively. The slots may be sized and/or shaped such that the plurality of discs are fixed to the hub when the plurality of discs are inserted into the slots. The slots are arranged (e.g., uniformly) along the second end of the respective extension. The positioning of the slots define heights of channels formed by adjacent discs of the plurality of discs, respectively. Any number of slot shapes, sizes, and/or spacing along the respective extension may be provided.

In act 902, the plurality of extensions are bent from an unloaded position (e.g., an initial position), towards the outer annular surface of the hub into a loaded position. For example, an external force may be applied to the plurality of extensions such that the plurality of extensions move from the initial, unloaded position, towards the outer annular surface of the hub, into the loaded position. The external force may be applied to the plurality of extensions with a cylindrical part having an opening. The cylindrical part may be slid onto the hub, such that an inner annular surface of the cylindrical part forming the opening abuts the plurality of extensions and bends the plurality of extensions towards the outer annular surface of the hub as the cylindrical part is slid onto the hub. The diameter of the opening may approximately match an outer diameter of the hub. "Approximately" may provide for additional spacing due to the bent extensions. Each disc of the plurality of discs has an opening defining an inner diameter of the disc. An outer diameter of the cylindrical part may be equal to or less than the inner diameter of the plurality of discs. In other examples, the cylindrical part is a different shape.

In act 904, the plurality of discs are positioned around the hub. The plurality of discs may be positioned around the hub, such that the hub is concentric with the plurality of discs within the openings of the plurality of discs. The plurality of discs are aligned with respective slots within the plurality of extensions.

In act 906, the plurality of extensions are released from the loaded position. For example, the external force applied to the plurality of extensions is removed. For example, the cylindrical part pressing the plurality of extensions against the outer annular surface of the hub is slid off of the hub. The inner annular surface of the cylindrical part may be smooth and provide low friction when the cylindrical part is slid off of the hub.

When the external force is removed (e.g., the cylindrical part is slid off of the hub), the plurality of elastic extensions move towards the unloaded position until the plurality of discs are positioned within the slots, respectively, and the plurality of discs are fixed to the hub at or adjacent to (e.g., within the slots) the second ends of the plurality of extensions, respectively. In one example, the plurality of discs are further attached to the plurality of extensions using, for example, welding, an adhesive, another fastener, or any combination thereof. In another example, the plurality of extensions do not include slots, and the plurality of discs are physically attached to the second ends of the plurality of extensions using, for example, welding, an adhesive, another fastener, or any combination thereof.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

In a first embodiment, a computing device includes a housing, a heat generating component supported within the housing, and a fan assembly. The fan assembly is operable to move heat generated by the heat generating component out of the housing. The fan assembly is supported within the housing and includes a shaft and a plurality of discs positioned along and fixed to the shaft. The shaft and the plurality of discs are rotatable relative to the housing about an axis of rotation.

In a second embodiment, with reference to the first embodiment, the housing includes a top, a bottom, and at least one side extending between the top and the bottom. The axis of rotation is perpendicular to the top, the bottom, or the top and the bottom.

In a third embodiment, with reference to the first embodiment, the plurality of discs includes more than two discs.

In a fourth embodiment, with reference to the first embodiment, the plurality of discs are equally spaced apart from each other along the shaft.

In a fifth embodiment, with reference to the fourth embodiment, a first disc of the plurality of discs is spaced at least 0.25 mm away from a second disc of the plurality of discs. The first disc is closer to the second disc than any other discs of the plurality of discs.

In a sixth embodiment, with reference to the first embodiment, each disc of the plurality of discs is a foil rigidly attached to the shaft.

In a seventh embodiment, with reference to the sixth embodiment, the foils are Mylar discs.

In an eighth embodiment, with reference to the first embodiment, each disc of the plurality of discs is cylindrical and includes a first circular side, a second circular side, and a third side extending from the first circular side to the second circular side. The first circular side, the second circular side, or the first circular side and the second circular side of at least one disc of the plurality of discs include an etched path that follows an expected air path.

In a ninth embodiment, with reference to the first embodiment, each disc of the plurality of discs is cylindrical and includes a first circular side, a second circular side, and a third circular side extending from the first circular side to the second circular side. The fan assembly further includes a housing. The shaft and the plurality of discs are rotatably supported within the housing of the fan assembly. The housing of the fan assembly includes an inlet and an outlet. The inlet is opposite the first circular side of a first disc of the plurality of discs, and the outlet is opposite the third sides of at least a subset of discs of the plurality of discs.

In a tenth embodiment, with reference to the ninth embodiment, the first disc includes at least one opening that extends from the first circular side, through the first disc, to the second circular side.

In an eleventh embodiment, with reference to the ninth embodiment, the housing of the fan assembly is a scroll-shaped housing. The scroll-shaped housing includes a circular portion and a rectangular portion. The inlet extends through the circular portion, and the outlet extends through the rectangular portion. A wedge is formed between the circular portion and the rectangular portion. The plurality of discs is positioned within the housing of the fan assembly such that the plurality of discs are adjacent to the wedge formed between the circular portion and the rectangular portion.

In a twelfth embodiment, with reference to the first embodiment, the housing includes a first side, a second side, and at least one third side extending between the first side and the second side. A maximum thickness of the housing, between the first side and the second side, is less than 5 mm.

In a thirteenth embodiment, with reference to the twelfth embodiment, the plurality of discs includes five or more discs.

In a fourteenth embodiment, with reference to the first embodiment, the fan assembly is operable to rotate the shaft and the plurality of discs at at least RPMs.

In a fifteenth embodiment, with reference to the fourteenth embodiment, the fan assembly further includes a housing. The shaft and the plurality of discs are rotatably supported within the housing of the fan assembly. An inner surface of the housing of the fan assembly is deflectable towards the plurality of discs in response to a force applied to an outer surface of the housing of the computing device. The shaft and the plurality of discs are rotatable at at least 10,000 RPMs when the inner surface of the housing deflects towards the plurality of discs.

In a sixteenth embodiment, with reference to the first embodiment, the shaft and the plurality of discs are made of metal.

In a seventeenth embodiment, with reference to the first embodiment, the computing device is a tablet computer.

In an eighteenth embodiment, with reference to the first embodiment, the shaft and the plurality of discs are a single contiguous part.

In a nineteenth embodiment, with reference to the first embodiment, the plurality of discs operate entirely within a viscous flow region.

In a twentieth embodiment, with reference to the first embodiment, each disc of the plurality of discs has a diameter of 50 mm or less.

In a twenty-first embodiment, with reference to the first embodiment, each disc of the plurality of discs includes at least one opening radially outward relative to the shaft.

In a twenty-second embodiment, with reference to the twenty-first embodiment, the openings vary in size along a length of the shaft.

In a twenty-third embodiment, with reference to the first embodiment, each disc of the plurality of discs includes at least one opening radially outward relative to the shaft.

In a twenty-fourth embodiment, with reference to the twenty-third embodiment, the openings vary in size along a length of the shaft.

In a twenty-fifth embodiment, with reference to the first embodiment, the shaft includes a hub having an outer annular surface and an inner annular surface. The shaft also includes two or more extensions. Each of the two or more extensions has a first end and a second end, and extends from the outer annular surface at the first end, in a direction away from the outer annular surface, to the second end. The plurality of discs are physically attached to the hub at or adjacent to the second ends of the two or more extensions, respectively.

In a twenty-sixth embodiment, with reference to the twenty-fifth embodiment, each of the two or more extensions includes a plurality of slots at the second end of the extension. The plurality of discs are positioned within the plurality of slots, respectively, such that the plurality of discs are physically attached to the hub.

In a twenty-seventh embodiment, a fan assembly for an electronic device is provided. The fan assembly includes a housing including an inlet and an outlet. The fan assembly also includes a bladeless impeller rotatably supported within the housing. The bladeless impeller includes a shaft and a plurality of flat plates fixed to the shaft. The plurality of flat plates are spaced along the shaft, such that a plurality of channels are formed between the plurality of flat plates.

In a twenty-eighth embodiment, with reference to the twenty-seventh embodiment, the plurality of flat plates are a plurality of discs fixed to the shaft.

In a twenty-ninth embodiment, with reference to the twenty-seventh embodiment, the housing is at least partially filled with a liquid, a vapor, a gas, or any combination thereof.

In a thirtieth embodiment, with reference to the twenty-eighth embodiment, the plurality of discs are a plurality of foils fixed to the shaft.

In a thirtieth-first embodiment, with reference to the thirtieth embodiment, the plurality of foils are made of Mylar.

In a thirty-second embodiment, with reference to the twenty-eighth embodiment, at least one disc of the plurality of discs includes a first circular side, a second circular side, and a third side extending between the first circular side and the second circular side. The first circular side, the second circular side, or the first circular side and the second circular side include surface features that match an expected path of air flowing over the at least one disc.

In a thirty-third embodiment, a method of manufacturing a fan assembly for an electronic device includes fixing a plurality of foils to a shaft, such that the plurality of foils are spaced apart from each other along the shaft. The plurality of foils spaced apart from each other form a plurality of channels.

In a thirty-fourth embodiment, with reference to the thirty-third embodiment, fixing the plurality of foils to the shaft includes fixing the plurality of oils to the shaft such that the plurality of foils are uniformly spaced along the shaft.

In a thirty-fifth embodiment, with reference to the thirty-fourth embodiment, each foil of the plurality of foils includes a first circular side, a second circular side, and a third side extending from the first circular side to the second circular side. The method also includes forming surface features on the first circular side, the second circular side, or the first circular side and the second circular side of at least one foil of the plurality of foils.

In a thirty-sixth embodiment, with reference to the thirty-fifth embodiment, forming surface features includes etching the first circular side, the second circular side, or the first circular side and the second circular side of the at least one foil based on a predetermined air path.

In a thirty-seventh embodiment, with reference to the thirty-sixth embodiment, the method further includes determining the predetermined air path. The determining includes computer modeling the fan assembly, injecting a sand blast into the fan assembly to identify the predetermined air path, or a combination thereof.

In a thirty-eighth embodiment, with reference to the thirty-third embodiment, fixing the plurality of foils to the shaft, such that the plurality of foils are spaced apart from each other along the shaft includes positioning a first foil of the plurality of foils, which has a first side and a second side, on a flange extending from a position at or adjacent to a first end of the shaft, such that the second side of the foil abuts the flange. The fixing also includes fixing the first foil to the shaft, the flange, or the shaft and the flange. The fixing includes positioning a spacer around the shaft and on the first foil, such that the spacer abuts the first side of the first foil. The fixing also includes fixing the spacer to the shaft, the first foil, or the shaft and the first foil. The fixing also includes positioning a second foil of the plurality of foils, which has a first side and a second side, on the spacer, such that the second side of the second foil abuts the spacer, and fixing the second foil to the shaft, the spacer, or the shaft and the spacer.

In a thirty-ninth embodiment, with reference to the thirty-third embodiment, the shaft includes a hub having an outer annular surface, and two or more extensions. Each of the two or more extensions has a first end and a second end, is elastic, and extends from the outer annular surface at the first end, in a direction away from the outer annular surface, to the second end. Each of the two or more extensions includes a plurality of slots at the second end of the extension. Fixing the plurality of foils to the shaft, such that the plurality of foils are spaced apart from each other along the shaft includes bending the two or more extensions from an unloaded position, towards the outer annular surface of the hub, into a loaded position. The fixing also includes positioning the plurality of foils around the hub, such that the plurality of foils are aligned with the plurality of slots, and releasing the two or more extensions, such that the two or more extensions move from the loaded position towards the unloaded position until the plurality of foils are positioned within the plurality of slots, respectively.

In connection with any one of the aforementioned embodiments, the thermal management device or the method for manufacturing the thermal management device may alternatively or additionally include any combination of one or more of the previous embodiments.

The foregoing description is given for clearness of understanding only, and no unnecessary limitations should be understood therefrom, as modifications within the scope of the claims may be apparent to those having ordinary skill in the art.

The invention claimed is:

1. A computing device comprising:
a housing;
a heat generating component supported within the housing;
a fan assembly operable to move heat generated by the heat generating component out of the housing, the fan assembly being supported within the housing and comprising
a shaft;
a hub connected to the shaft and having an outer annular surface;
a plurality of discs positioned along the shaft; and
two or more extensions extending from the hub, each of the two or more extensions having a first end and a second end, being elastic, and extending from the outer annular surface at the first end, in a direction away from the outer annular surface, to the second end, the second end connected to at least one of the plurality of discs,
wherein the shaft and the plurality of discs are rotatable relative to the housing about an axis of rotation.

2. The computing device of claim 1, wherein the housing comprises a top, a bottom, and at least one side extending between the top and the bottom, and
wherein the axis of rotation is perpendicular to the top, the bottom, or the top and the bottom.

3. The computing device of claim 1, wherein one or more spaces are formed between the outer annular surface of the hub, the two or more extensions, and the plurality of discs.

4. The computing device of claim 3, wherein the spaces allow air to flow into channels formed between the plurality of discs.

5. The computing device of claim 1, wherein the plurality of discs are physically attached to the hub at or adjacent to the second ends of the two or more extensions, respectively.

6. The computing device of claim 5, wherein each of the two or more extensions includes a plurality of slots at the second end of the extension, the plurality of discs being positioned within the plurality of slots, respectively, such that the plurality of discs are physically attached to the hub.

7. The computing device of claim 1, wherein each disc of the plurality of discs is cylindrical and includes a first circular side, a second circular side, and a third side extending from the first circular side to the second circular side, and
wherein the first circular side, the second circular side, or the first circular side and the second circular side of at least one disc of the plurality of discs include an etched path.

8. The computing device of claim 1, wherein each disc of the plurality of discs is cylindrical and includes a first circular side, a second circular side, and a third side extending from the first circular side to the second circular side,
   wherein the fan assembly further comprises a housing, the shaft and the plurality of discs being rotatably supported within the housing of the fan assembly,
   wherein the housing of the fan assembly comprises an inlet and an outlet, the inlet being opposite the first circular side of a first disc of the plurality of discs, and the outlet being opposite the third sides of at least a subset of discs of the plurality of discs.

9. The computing device of claim 8, wherein the first disc includes at least one space that extends from the first circular side, through the first disc, to the second circular side.

10. The computing device of claim 8, wherein the housing of the fan assembly is a scroll-shaped housing, the scroll-shaped housing comprising a circular portion and a rectangular portion, the inlet extending through the circular portion and the outlet extending through the rectangular portion,
   wherein a wedge is formed between the circular portion and the rectangular portion, and
   wherein the plurality of discs are positioned within the housing of the fan assembly such that the plurality of discs are adjacent to the wedge formed between the circular portion and the rectangular portion.

11. The computing device of claim 1, wherein the housing comprises a first side, a second side, and at least one third side extending between the first side and the second side, and
   wherein a maximum thickness of the housing, between the first side and the second side, is less than 5 mm.

12. A fan assembly for an electronic device, the fan assembly comprising:
   a housing comprising an inlet and an outlet;
   a hub connected to the shaft and having an outer annular surface;
   a bladeless impeller rotatably supported within the housing, the bladeless impeller comprising a shaft and a plurality of flat plates fixed to the shaft, the plurality of flat plates being spaced along the shaft, such that a plurality of channels are formed between the plurality of flat plates; and
   two or more extensions, each of the two or more extensions having a first end and a second end, being elastic, and extending from the outer annular surface at the first end, in a direction away from the outer annular surface, to the second end, the second end connected to at least one of the plurality of flat plates.

13. The fan assembly of claim 12, wherein the housing is at least partially filled with a liquid, a vapor, or any combination thereof.

14. The fan assembly of claim 13, wherein at least one disc of the plurality of discs comprises a first circular side, a second circular side, and a third side extending from the first circular side to the second circular side, and
   wherein the first circular side, the second circular side, or the first circular side and the second circular side include surface features.

15. A method of manufacturing a fan assembly for an electronic device, the method comprising:
   fixing a plurality of foils to a shaft, such that the plurality of foils are spaced apart from each other along the shaft, the plurality of foils spaced apart from each other forming a plurality of channels, a hub connected to the shaft and having an outer annular surface, and two or more extensions, each of the two or more extensions having a first end and a second end, being elastic, and extending from the outer annular surface at the first end, in a direction away from the outer annular surface, to the second end, the second end connected to at least one of the plurality of foils.

16. The method of claim 15, wherein fixing the plurality of foils to the shaft comprises fixing the plurality of foils to the shaft such that the plurality of foils are uniformly spaced along the shaft.

17. The method of claim 15, wherein each foil of the plurality of foils comprises a first circular side, a second circular side, and a third side extending from the first circular side to the second circular side, and
   wherein the method further comprises forming surface features on the first circular side, the second circular side, or the first circular side and the second circular side of at least one foil of the plurality of foils.

18. The method of claim 17, wherein forming surface features comprises etching the first circular side, the second circular side, or the first circular side and the second circular side of the at least one foil.

19. The method of claim 15, wherein the shaft comprises:
   wherein fixing the plurality of foils to the shaft, such that the plurality of foils are spaced apart from each other along the shaft comprises:
      bending the two or more extensions from an unloaded position, towards the outer annular surface of the hub, into a loaded position;
      positioning the plurality of foils around the hub, such that the plurality of foils are aligned with the plurality of slots; and
      releasing the two or more extensions, such that the two or more extensions move from the loaded position towards the unloaded position until the plurality of foils are positioned within the plurality of slots, respectively.

* * * * *